US005656336A

United States Patent [19]
Kamen et al.

[11] Patent Number: 5,656,336
[45] Date of Patent: *Aug. 12, 1997

[54] GLASS DECORATING METHOD USING BIS-PHENOL-A EPOXY RESINS AND RELATED COMPOSITIONS AND ARTICLES

[75] Inventors: Melvin Edwin Kamen, Highlands; Ming Hu, Piscataway, both of N.J.

[73] Assignee: Revlon Consumer Products Corporation, New York, N.Y.

[*] Notice: The term of this patent shall not extend beyond the expiration date of Pat. No. 5,562,951 and the term of this patent shall not extend beyond the expiration date of Pat. No. 5,571,359.

[21] Appl. No.: 612,696

[22] Filed: Mar. 8, 1996

[51] Int. Cl.$^6$ .................. C03C 17/32; C03C 17/30; C03C 63/00; C08J 3/28

[52] U.S. Cl. .................. 427/511; 522/31; 523/160; 523/427

[58] Field of Search .................. 427/511; 522/31; 523/160, 427

[56] References Cited

U.S. PATENT DOCUMENTS

| | | |
|---|---|---|
| 3,382,137 | 5/1968 | Schrieber . |
| 3,773,703 | 11/1973 | Smeal .................. 523/417 |
| 3,972,765 | 8/1976 | Kondo . |
| 4,104,143 | 8/1978 | Wasilewski . |
| 4,175,972 | 11/1979 | Crivello . |
| 4,246,298 | 1/1981 | Guarnery . |
| 4,362,783 | 12/1982 | Graham . |
| 4,400,676 | 8/1983 | Mitsui . |
| 4,791,204 | 12/1988 | Jost et al. .................. 548/101 |
| 4,961,976 | 10/1990 | Hashimoto . |
| 5,229,251 | 7/1993 | Babich . |
| 5,346,933 | 9/1994 | Knell . |
| 5,391,247 | 2/1995 | Kamen . |
| 5,411,768 | 5/1995 | Knell . |
| 5,487,927 | 1/1996 | Kamen . |

FOREIGN PATENT DOCUMENTS

| | | |
|---|---|---|
| 0071345 | 2/1983 | European Pat. Off. . |
| 0435354 | 7/1991 | European Pat. Off. . |
| 0533094 | 3/1993 | European Pat. Off. . |
| 0557494 | 4/1993 | European Pat. Off. . |
| 4307766 | 6/1994 | Germany . |
| 210 180 | 8/1988 | Japan . |

OTHER PUBLICATIONS

Technical Information, Irgacure 261 Mar. 1995.
Chemistry & Technology UV & EB Formulation for Coahogs, Inks & Paints, vol. 3, pp. 332–374 1991.
3M Fluorad–Fluorochemical Surfactant FC 171 Product Information Apr. 1994.
3M FC 171 Fluorad Brand Fluorochemical Surfactant—Material Safety Data Sheet Jan. 1995.
3M Fluorad Fluorochemical Surfactants—Selection Guide Oct. 1994.
Huls–Applications of OroanoFunctional Silanes—Dynasylan, Aug. 1993.
Presenting the Solutions for Your Problems—3M 1992.
U.S. Serial No. 199,414 Filed Feb. 22, 1994.
U.S. Serial NO. 432,382 Filed May 1, 1995.
Data Sheet BYK–022, BYK Chemie USA Apr. 1992.
Data Sheet BYK–354, BYK Chemie USA Apr. 1992.
Sartomer—Escacure ITX Bulletin Jul. 1992.
Dow Liquid Epoxy Resins, 1990.
DER 661 Solid Epoxy Resins, Technical Data Sheet Oct. 1990.
EPON Resins, Shell Chemical Co. 1990.

*Primary Examiner*—D. R. Wilson
*Attorney, Agent, or Firm*—Julie Blackburn

[57] ABSTRACT

A method for applying a decoration to a glass substrate comprising applying an ink composition comprising a bis phenol-A epoxy resin to the glass in a predetermined design that leaves some areas of the glass ink free, said ink being operable when cured to bond to the glass substrate, and curing the ink on the substrate by exposing it to the radiation by which it is curable thereby bonding the ink to the glass substrate.

19 Claims, No Drawings

GLASS DECORATING METHOD USING BIS-PHENOL-A EPOXY RESINS AND RELATED COMPOSITIONS AND ARTICLES

TECHNICAL FIELD

The invention is in the field of applying decorative indicia to glass and ceramic articles and containers.

BACKGROUND OF THE INVENTION

Commercial ceramic and glassware is often decorated by applying a pattern in colored ink on the surface of the substrate with screen printing, offset printing, or any other direct application technique. The glass is then baked at high temperatures to bond the design or indicia to the glass surface. This process, sometimes referred to as applied ceramic labeling (ACL), exhibits certain drawbacks. Often, the ink compositions contain heavy metals and volatile organic solvents (VOC's). Both VOC's and heavy metals are undesirable from the environmental point of view. Second, ACL requires high temperature ovens for the baking step, which results in considerable energy usage and an increased potential for worker injury due to the high temperatures at which the process operates. Moreover, the high temperature ovens are expensive, cumbersome pieces of equipment which require considerable floor space in factories.

On the other hand, use of ultraviolet (UV) radiation curable organic pigmented inks for the decoration of glass and ceramic ware is very desirable. Organic inks generally can be cured by exposure to radiation, such as ultraviolet radiation, thus obviating the need for high temperature baking. In addition, UV curable organic inks can be formulated to contain little or no VOC's or other nonaqueous solvents. One problem with organic inks, however, is that it is difficult to duplicate the adhesion found with ACL decorated glass. For example, ACL provides decorated glass containers where the indicia or decoration are essentially adhered permanently, and it is quite difficult, if not impossible, to remove the decoration from the glass surface. The same is not true of glass substrates decorated with organic inks. In general, to find organic inks which will adequately adhere to glass to a degree sufficient to pass various tests necessary for use in commerce is quite difficult. There is a need to develop better ink compositions and methods for decorating glass and ceramicware, to work toward the goal of providing UV curable, organic-based-ink decorated glass which equals ACL decorated glass in durability and commercial application.

SUMMARY OF THE INVENTION

The invention is directed to a radiation curable ink composition comprising, by weight of the total composition:

30–95% of a bis phenol-A epoxy resin having the formula ("Formula I"):

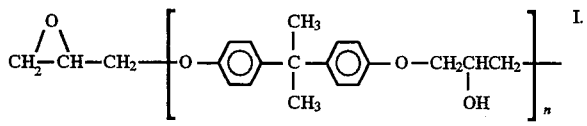

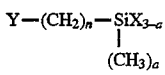

wherein n=0–20, 0.1–25% of an organofunctional silane having the formula ("Formula II"):

$$Y-(CH_2)_n-SiX_{3-a} \atop (CH_3)_a \qquad II.$$

wherein n=0–3 a=0–2

Y=NH$_2$, CH$_2$=CH, $$CH_2=C-COO-, \atop CH_3$$

CH$_3$—NH—, NH$_2$—CO—NH—, HS, Cl, NH$_2$(CH$_2$)$_2$NH—,

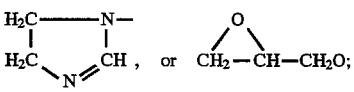

X is each independently CH$_3$, Cl, OCOCH$_3$, OC$_2$H$_4$OCH$_3$, (OC$_2$H$_4$)$_2$OCH$_3$, or —OR, where R is a C$_{1-20}$ straight or branched chain alkyl, preferably methyl or ethyl, and 0.1–25% of a cationic photoinitiator, and 0.01–20% of a fluorinated surfactant.

The invention is also directed to a method for applying a colored decoration to a glass substrate comprising:

a) applying a radiation curable ink composition comprising a bis phenol-A epoxy resin to the glass in a predetermined design that leaves some areas of the glass ink-free, said ink being operable when cured to bond to the glass substrate, b) curing the ink on the substrate by exposing it to the radiation by which it is curable, thereby bonding the ink to the glass substrate.

The invention is also directed to a method for decorating a glass substrate with hot stamping foil comprising:

a) applying a bis phenol-A epoxy resin ink to the glass substrate in a predetermined design that leaves some areas of the glass ink-free, said ink being operable when cured to bond to the glass substrate and to hot stamping foil, b) curing the ink on the substrate by exposing it to the radiation by which it is curable thereby bonding the ink to the substrate, c) compressing a layer of hot stamping foil against the cured ink design with a compress heated to a temperature sufficient to cause the hot stamping foil to adhere to the cured ink design but not to the ink-free areas of the glass, d) removing the compress, thereby leaving hot stamping foil adhered to the cured ink design but not to the ink-free areas of the glass.

The invention is also directed to a glass container having an inner surface and an outer surface wherein:

a) said outer surface has adhered thereto a partial coating of a cured adhesive ink comprised of a bis phenol-A epoxy resin in a design that covers less than all of said outer surface.

The invention is also directed to a glass container having an inner surface and an outer surface wherein:

a) said outer surface has adhered thereto a partial coating of a cured adhesive ink comprised of a bis phenol-A epoxy resin in a design that covers less than all of said outer surface,
b) the ink design is covered by a multilayer web comprised of (i) a hot melt adhesive, (ii) a color coating, and (iii) a protective top coating, in that order from the ink design outward, said web being adherent to the cured adhesive ink and covering only said adhesive ink and not extending to the ink-free areas of said outer surface.

DETAILED DESCRIPTION

Unless otherwise stated, all percentages herein are weight percentages and all ratios are weight ratios. The ink compositions of the invention are preferably free of VOC's or other nonaqueous solvents, or contain these ingredients only in very minimal amounts. The ink compositions used in the invention preferably have a viscosity of 7,000 to 30,000 centipoise at 25° C., more preferably 10,000 to 25,000 centipoise at 25° C. The ink compositions comprise 30–95%, preferably 35–90%, more preferably 50–90% by weight of the total composition of a bis phenol-A epoxy resin. Suitable bis phenol-A epoxy resins are those which result from the reaction of bis phenol-A and epichlorohydrin. Bis phenol-A epoxy resins such as those made by Ciba-Geigy under the tradename ARALDITE, Shell corporation under the tradenames EPON or Epikote, such as Epikote 828 or 1001, or EPON 825, Celanese Corporation under the EPI-REZ tradename, Reichhold Chemicals, Inc. under the EPOTUF tradename, and Union Carbide under the ERL tradename, are suitable. Bis phenol-A epoxy resins as disclosed in U.S. Pat. No. 5,229,251, which is hereby incorporated by reference, may also be used. Such resins include epoxidized novolacs such as those sold under the tradenames EPI-REZ SU6$^R$, or SU8$^R$. Preferred are bis phenol-A epoxy resins sold by Dow Chemical Company under the D.E.R. tradenames, and in particular, those of Formula I, which is:

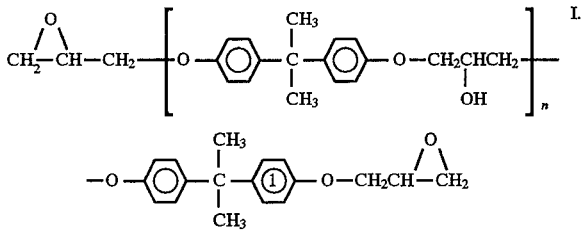

wherein n=0–20.

The ink composition of the invention may contain a mixture of liquid and solid bis phenol-A epoxy resins as the epoxy resin component, however the final composition will generally be of a liquid or semi-solid consistency which is pourable or screenable at room temperature without the application of heat to melt the composition and make it more workable. Preferably the bis phenol-A epoxy resin is a mixture of liquid and solid bis phenol-A epoxy resins, and in a preferred weight ratio of 10:1 to 40:1 respectively. When the bis phenol-A epoxy resin is a liquid, the typical value for n in Formula I is 0–3, and if a solid, the value for n in Formula I is greater than 3. Preferably, the liquid his phenol-A epoxy resin has an epoxide equivalent weight of 172 to 250, and a viscosity of 400 to 25,000 centipoise at 25° C., and more preferably an epoxide equivalent weight of 182–192. If a solid bis phenol-A epoxy resin is incorporated into the ink compositions, it is generally a particulate flake powder, has an epoxide equivalent weight of 400 to 600, preferably 500–560, and viscosity of 400 to 800 centipoise at 150° C.

The compositions of the invention preferably contain 0.1–25%, preferably 0.5–15%, more preferably 1–10% of an adhesion promoter which will enhance adhesion of the resin to the glass surface. Organofunctional silanes are excellent adhesion promoters, and in particular organofunctional silanes of Formula II, which is:

$$Y-(CH_2)_n-\underset{(CH_3)_a}{SiX_{3-a}}$$  II.

wherein n=0–3
a=0–2
Y=NH$_2$, CH$_2$=CH,

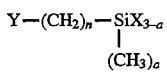

CH$_3$—NH—, NH$_2$—CO—NH—, HS—, Cl—, NH$_2$(CH$_2$)$_2$NH—,

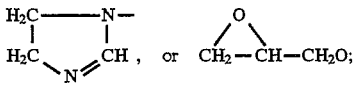

X is each independently CH$_3$, Cl, OCOCH$_3$, OC$_2$H$_4$OCH$_3$, (OC$_2$H$_4$)$_2$OCH$_3$, or —OR, where R is a C$_{1-20}$ straight or branched chain alkyl, preferably methyl or ethyl.

Silanes having this formula are commercially available under the Dynasynlan trademark from Huls, America, Inc., Piscataway, N.J. Other organofunctional silanes such as those disclosed in U.S. Pat. No. 5,221,560, which is hereby incorporated by reference, are also suitable. Such organosilanes are acryloxyfunctional silanes including 3-methacryloxypropyltrimethoxysilane, 3-acryloxypropyltrimethoxysilane, 2-methacryloxyethyltrimethyoxysilane, 2-acryloxyethyltrimethyoxysilane, 3-methacryloxypropyltriethoxysilane, 3-acryloxypropyltrimethyoxysilane, 3-acryloxypropyltriethoxysilane, 2-methacryloxyethyltriethoxysilane, 2-methacryloxyethyltriethoxysilane, 2-acryloxyethyltriethoxysilane, etc. Suitable glycidoxy silanes include 3-glycidoxypropyltrimethoxysilane, 2-glycidoxyethyltrimethoxysilane, 3-glycidoxypropyltriethoxysilane, 2-glycidoxyethyltriethoxysilane, 3-glycidoxypropyltrimethyl silane, and so on.

The ink compositions of the invention also preferably contain 0.01–20%, preferably 0.5–10%, more preferably 1–5% by weight of a fluorinated surfactant. The term "fluorinated surfactant" means a fluorine containing compound having at least one liphophilic group or portion and at least one hydrophilic group or portion. In particular, fluorocarbon or fluorosilicone surfactants are most desireable. Suitable surfactants include those set forth in U.S. Pat.

No. 4,961,976 which is hereby incorporated by reference. Preferred are fluorocarbon surfactants, such as those marketed under the Fluorad trademark by 3M Company. These fluorochemical surfactants include fluorinated alkyl esters, fluorinated alkyl polyoxyethylene ethanols, and the like. Particularly preferred are nonionic fluorinated alkyl alkoxylates e.g. those marketed by 3M under the trademark FC-171.

The ink compositions oft he invention also preferably contain 0.1–25%, preferably 0.1–20%, more preferably 2–10% by weight of a cationic photoinitiator. The term "cationic photoinitiator" means a molecule or ingredient which, upon excitation, undergoes a photochemical transformation which efficiently generates a species capable of initiating cationic polymerization. If the ink composition of the invention is cured by UV or actinic radiation rather than electron beam it is desirable to add a cationic photoinitiator which catalyzes cross-linking of the resin upon exposure to the radiation to which the resin is sensitive. On the other hand, if the ink compositions of the invention are cured with electron beam it may be possible to dispense with the cationic photoinitiator. Various types of cationic photoinitiators are suitable. Both ionic cationic photoinitiators such as onium salts or organometallic salts are suitable as well as non-ionic cationic photoinitiators such as organosilanes, latent sulphonic acids and the like. Preferred are photosensitive onium salts, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974. Also suitable are ferrocenium salts such as those sold under the Irgacure tradename by Ciba-Geigy, in particular Irgacure 261. Sulphonyloxy ketones and silyl benzyl ethers are also good cationic photoinitiators. A detailed analysis of the mechanism of cationic curing is disclosed in "Photosensitized Epoxides as a Basis for Light-Curable Coatings" by William R. Watt, American Chemical Society Symposium, Set. 114, Epoxy Resin Chemistry, Chapter 2, 1979, and in "Chemistry and Technology of UV and EB Formulation for Coatings, Inks, and Paints," Volume 3, entitled "Photoinitiators for Free Radical and Cationic Polymerization, K. K. Dietliker, pages 332–374 (1991), both of which are hereby incorporated by reference. Photosensitive onium salts are used as photoinitators in cationic curing, in particular, onium salts such as those disclosed in U.S. Pat. Nos. 4,058,401, 4,138,255, 4,161,478, 4,175,972, all of which are hereby incorporated by reference. Triaryl sulphonium salts are most preferred, in particular triaryl sulphonium salts such as those sold by Union Carbide under the tradename Cyracure UVI 6990 and 6974.

With certain ink colors it may also be desired to include in the ink composition a photosensitizer, which is generally defined as a molecule which absorbs radiant energy which it then passes on to the photoinitiator. The photosensitizer then returns to its energetic ground state while the photoinitiator is activated and undergoes chemical changes as if it had itself absorbed the energy. As the photosensitizer often absorbs energy in a different part of the spectrum then does the photointiatior, thus a more effective use of the light source can be achieved. If a photosensitizer is used, generally a 1:10 to 1:200, more preferably 1:50 to 1:100 ratio of photosensitizer to photoinitiator respectively, is suggested. Typical examples of photosensitizers which assist in cationic curing are thioxanthone compounds, in particular isopropyl thioxanthone which is marketed under the Escacure ITX trademark by Sartomer.

The ink compositions may contain 0.1–40%, preferably 1–30%, more preferably 3–25% by weight of the total composition of pigment. A wide variety of pigments are suitable including organic and inorganic pigments. Examples of such pigments are set forth in U.S. Pat. No. 5,178,952, which is hereby incorporated by reference. Inorganic pigments include extender pigments such are baryites, barium sulfate, calcium carbonate, talc, clay, alumina, titanium dioxide, white carbon, chinese white, zinc sulfide, lithopone, ultramarine, Prussian blue, cobalt, chrome oxide, viridian chrome green yellows, oranges, and reds, cadmium, chromium, iron oxides, carbon black, metallic pigments, aluminum powder, bronze powder, zinc chromate, strontium chromate, zinc dust, copper, and so on. Examples of suitable organic pigments include azo pigments, indolinones, isoindolinones, vat pigments, the Lakes, pthalocyanine pigments and so on. The preferred pigment to impart white color to the ink composition is titanium dioxide. Preferred red and yellow pigments are isoindolinones and pyrrolopyrrols as disclosed in U.S. Pat. Nos. 4,415,685; 4,579,949; 4,791,204; 4,666,455; 5,074,918; 4,783,540; 4,914,211; 4,585,878; as well as U.S. patent application Ser. No. 199,414, filed Feb. 22, 1994, now U.S. Pat. No. 5,571,359 Kamen, et. al., which is hereby incorporated by reference. These pyrrolopyrrols are generally of the formula:

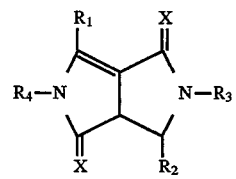

wherein $R_1$ and $R_2$ are each independently alkyl, arylalkyl, aryl, substituted or unsubstituted isocyclic or heterocyclic aromatic radicals; $R_3$ and $R_4$ are each independently H, substituted or unsubstituted alkyl, alkoxycarbonyl, aroyl, phenyl, benzoyl, benzyl, arylalkyl, aryl, alkanoyl, $C_{5-6}$ cycloalkyl, alkenyl, alkynyl, carbamoyl, alkylcarbamoyl, arylcarbamoyl, or alkoxycarbonyl; and X is O or S. Preferred is a compound wherein $R_1$ and $R_2$ are each independently phenyl or naphthyl, $R_3$ and $R_4$ are hydrogen, and X is O. Particularly preferred is pyrrolo 3,4-C pyrrol-1,4-dione, 2,5-dihydro-3,6-di-4-chlorophenyl which has a CAS number 84632-65-5 and is known by the common name C.I. pigment red 254. This pigment is commercially available from Ciba-Geigy Pigments Division, Newport, Del., under the tradename Irgazin DPP Red 80. Other Ciba-Geigy red pigments sold under the tradename Irgazin are also suitable.

Suitable isoindolinones are as set forth in U.S. Pat. Nos. 3,884,955, 3,867,404, 4,978,768, 4,400,507, 3,897,439 and 4,262,120 and 5,194,088 all of which are hereby incorporated by reference. Preferred isoindolinones are tetrachlorocyanobenzoic acid alkyl esters, particularly benzoic acid, 2,3,4,5-tetrachloro-6-cyano-methyl ester which is reacted with 2-methyl-1,3-benzenediamine and sodium methoxide. This pigment composition has the common name C.I. Pigment Yellow 109 and is available commercially from Ciba-Geigy Pigments Division, Newport Del. under the tradename Irgazin yellow 2GLTE. Other pigments in the Irgazin Yellow series as manufactured by Ciba-Geigy are also suitable.

The ink compositions used in the method of the invention will preferably contain about 0.1–10%, preferably 0.5–8%, more preferably 1–7% by weight of a defoaming agent which will cause the ink to apply smoothly on the glass substrate without bubbles or unevenness. A wide variety of defoamers are suitable, but preferred are defoamers sold by BYK Chemie under the BYK tradename. Examples of such defoamers include polyalkyl acrylics such as BYK-052 and BYK-053; and in particular BYK-052 which is polyvinylbutyl ether in Stoddard solvent; BYK-354 which is a polyacrylate solution, and BYK-022 which is a mixture of hydrophobic solids and foam destroying polysiloxanes in polyglycol.

The preferred ink compositions comprise:

30–95% bis phenol-A epoxy resin,
0.1–10% adhesion promoter,
0.1–20% photoinitiator,
0.01–5% fluorinated surfactant, and
1–40% pigment.

More preferably the ink compositions comprise:

35–95% of the bis phenol-A epoxy resin of Formula I,
0.1–10% of the organofunctional silane of Formula II,
0.1–20% of a photoiniator which is an onium salt,
0.05–5% of a fluorocarbon surfactant, and
0.1–40% pigment.

More preferred are ink compositions comprising:

50–85% of the bis phenol-A epoxy resin of Formula I which is a liquid at room temperature,
0.1–20% of the bis phenol-A epoxy resin of Formula I which is a solid at room temperature,
0.1–10% of the organofunctional silane of Formula II wherein:
a=0
X=OCH$_3$, OC$_2$H$_5$, CH$_3$
n=3
Y=

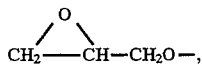

CH$_2$=C(CH$_3$)—COO—, H$_2$N(CH$_2$)$_2$NH—, or

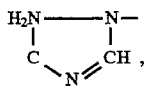

0.1–5% of a fluorocarbon surfactant which is a fluorinated alkyl ester, a fluorinated alkyl polyoxyethylene ethanol, or a fluorinated alky alkoxylate, and
0.1–40% pigment.

Most preferred are ink compositions comprising:

50–85% of the epoxy resin of Formula I which is a liquid at room temperature,
1–5% of the epoxy resin of Formula I which is a solid at room temperature,
0.1–5% of the organofunctional silane of Formula II having the formula:

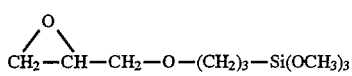

0.1–10% of a fluorinated alkyl alkoxylate, and
0.1–40% pigment.

The invention also comprises a method for applying a colored decoration to a glass substrate comprising:

a) applying a radiation curable ink composition comprising a bis phenol-A epoxy resin to the glass in a predetermined design that leaves some areas of the glass ink-free, said ink being operable when cured to bond to the glass substrate, b) curing the ink on the substrate by exposing it to the radiation by which it is curable, thereby bonding the ink to the glass substrate.

In the preferred embodiment of the invention the ink compositions comprise, by weight of the total composition, 30–95% bis phenol-A epoxy resin, 0.1–40% pigment, and optionally, up to 50% or more of other ingredients such as those discussed above.

The articles which may be decorated or printed according to the method of the invention may be made of glass, ceramic, tile, and other similar vitreous materials. Such articles may be in any shape or form, such as a container, sheet, tile, figurine, or the like. In the preferred embodiment of the invention the article is made of glass or ceramic and is a container, such as a cosmetic or beverage container. The term "glass" when used in accordance with the invention shall mean glass, ceramic, tile, and similar materials.

The ink composition is applied to the article to be decorated in a predetermined design using a variety of printing methods including screen printing, offset printing, gravure, hand painting and the like. After the ink is applied the substrate or article is irradiated with UV or actinic radiation using a conventional UV light source. The term "UV" means ultraviolet light which generally has a wavelength of 4 to 400, preferably 325 to 400 nanometers. The term "actinic" means radiation having a wavelength of 200 to 600 nanometers. Electron beam may be used instead of a UV light source. If a UV conveyer is used, it is set up so that the substrate passes through the beam of radiation for an amount of time appropriate to completely cure the ink composition and cause it to adhere to the substrate. If desired, the substrate may be moved through the conveyer in one or more passes to achieve the required curing. The appropriate time varies depending on the ink formula, but generally curing is complete in a period of time ranging from fractions of a second to 30 minutes. It is preferred, that by the time the decorated substrate or article is removed from the conveyer, the ink is completely cured and fused to the substrate surface, providing a bright true color. In some cases it may be necessary to subject the newly screened glass container to slightly elevated temperature prior to UV curing the applied ink on the substrate, or to an additional post-UV cure application of heat to finally polymerize the ink on the substrate. This ink is well suited for use in automated systems such as the multiple color printing apparatus disclosed in copending application Ser. No. 432,485, filed May 1, 1995 by Kamen, et al., entitled "Apparatus and Method For Screen Printing Radiation Curable Compostions", or with the methods disclosed in U.S. patent application Ser. No. 432,482, filed May 1, 1995 by Kamen et al., entitled "Method For Printing Articles With Multiple Radiation Curable Compositions", now U.S. Pat. No. 5,562,951 both of which are hereby incorporated by reference in their entirety.

In the method of the invention, multiple colors may be applied to the glass substrate by applying and curing one color, and printing the desired design on the container in complete or partial registration in another color, and curing that color directly on the glass substrate. As many successive colors as desired may be applied to the glass in complete or partial registration. The ink exhibits excellent adhesion to the glass and the colored layers adhere well to each other when in registration. It should be noted that this is not always the case when printing multiple colors one on top of the other. Often, while the first applied ink will adhere to the glass, the successively applied layers will not adhere to each other when applied in complete or partial registration.

In another embodiment of the invention, it is possible to make the ink composition of the invention without the pigment and print it on the glass substrate in predetermined design according to the methods described above. For example, a substrate such as a container may be decorated in a pre-determined design by silk screening the unpigmented ink composition on the substrate and curing with the appropriate radiation. A layer of hot stamping foil is then compressed against the substrate with a press which is heated to a temperature sufficient to cause the hot stamping foil to adhere to the printed ink design but not to the ink-free areas of the glass. Hot stamping foil is generally a laminate comprised of a carrier material (often polyester or a similar material capable of release), a release film between the carrier and a subsequent decorative coat which is usually color or a metallized coat, most often aluminum or colored aluminum. The foil may contain other optional layers such as one or more protective layers, hot melt adhesive layers, etc. between the metallized layer or layers and the carrier material. More specifically, hot stamping foil can be defined as a multilayer web comprised of a backing film carrier, a release coating, one or more protective top coatings, one or more color coatings, and a hot melt adhesive in that order. The hot stamping foil is then compressed against the container with the hot melt adhesive layer being compressed against the substrate. The compress, which may be a standard hot stamping press or a hand held press, is heated to a temperature sufficient to cause the hot melt adhesive layer of the hot stamping foil to adhere to the ink decorated portion of the substrate. Generally this temperature ranges from about 250° to 400° F. Temperatures higher than this may cause deterioration of the hot stamping foil. The application of heat causes the adhesive side of the hot stamping foil to become adhesively adhered to the ink design but not to the ink-free areas of the substrate. When the compress is removed, a portion of the foil laminate adheres to the ink decoration but not to the ink free areas of the glass. In particular, adhered to the ink design on the substrate is the hot melt adhesive layer, the color coatings, and the protective top coatings, in that order, of the hot stamping foil. Portions of the release coating may or may not be adhered to the protective top coating because the release coating is designed to melt upon application of heat and cause the polyester carrier backing layer to release from the protective top coat layer and some remnants may remain. The resulting hot stamped substrate exhibits a metallic gold, silver, or colored appearance depending on the color of the hot stamping foil.

In yet another embodiment of the invention, it is possible to provide a decorated substrate which has a two tone effect where all or a portion of the colored ink on the substrate is hot stamped. In this instance a pigmented ink composition is applied to the substrate in a predetermined design and cured by exposing it to the radiation by which it is curable for a time sufficient to effect complete cure. Hot stamping foil is applied as described above to either the entire ink design or to only a part (i.e. complete or partial registration). If the hot stamping foil is applied in partial registration, or applied to a portion of the pigmented ink design, a pleasant two tone effect is achieved. Many times it is more economical to print the entire design on the substrate using colored ink and then hot stamp over the desired portion of the design, rather than applying clear ink and hot stamping, and then printing colored ink in the desired design in a second application.

The invention is also directed to a glass container having an inner surface and an outer surface wherein:

a) said outer surface has adhered thereto a partial coating of a cured adhesive ink comprised of a bis phenol-A epoxy resin in a design that covers less than all of said outer surface.

The invention is also directed to a glass container having an inner surface and an outer surface wherein:

a) said outer surface has adhered thereto a partial coating of a cured adhesive ink comprised of a bis phenol-A epoxy resin in a design that covers less than all of said outer surface.

b) the ink design is covered by a multilayer web comprised of (i) a hot melt adhesive, (ii) a color coating, and (iii) a protective top coating, in that order from the ink design outward, said web being adherent to the cured adhesive ink and covering only said adhesive ink and not extending to the ink-free areas of said outer surface.

The ink composition may or may not be pigmented, as desired. If it is, generally it comprises, by weight of the total composition, 30–95% of a bis phenol-A epoxy resin and 0.1–40% pigment, which ink composition is in the form of a predetermined design or indicia which covers less than all of said outer surface. If pigmented, the hot stamping foil may be applied to all, or only a portion of the cured ink design.

The invention will be further described in connection with the following examples which are set forth for the purposes of illustration only.

EXAMPLE 1

A white ink was made according to the following formula:

|  | w/w % |
| --- | --- |
| DER 333[1] | 72.30 |
| DER 661[2] | 3.81 |
| Glymo[3] | 2.2 |
| Titanium dioxide | 16.0 |
| FC-171[4] | 0.30 |
| BYK-022[5] | 2.00 |
| Escacure ITX[6] | 0.10 |
| UVI-6990[7] | 6.00 |

[1]Dow liquid epoxy resin DER 331, Dow Chemical Company, Midland, Michigan.
[2]Dow solid epoxy resin DER 661, Dow Chemical Company, Midland, Michigan.
[3]Dynasylan organofunctional silane, Huls American, Inc., Piscataway, New Jersey.
[4]Flourad brand fluorochemical surfactant, 3M Company, St. Paul, Minnesota. (Fluorinated alkyl alkoxylates 93%, fluorinated alkyl sulfonamide 10%, Fluorinated alkoxylate 4%, and Fluorinated alkyl sulfonamide 1%).
[5]Mixture of hydrophobic solids and foam-destroying polysiloxanes in polyglycol, BYK Chemie, USA, Wallingford, Connecticut.
[6]Isopropyl thioxanthione, Sartomer.
[7]Photoinitiator, triarylsulphonium salt, Union Carbide Chemicals and Plastics.

EXAMPLE 2

A red ink composition was made according to the following formula:

|  | w/w % |
| --- | --- |
| DER 331 | 78.6 |
| DER 661 | 4.0 |

-continued

| | w/w % |
|---|---|
| Glymo | 2.0 |
| C.I. Pigment Red 254 | 7.0 |
| BYK-052[1] | 1.0 |
| BYK-354[2] | 1.0 |
| FC-171 | 0.3 |
| UVI-6990 | 6.0 |

[1] Polyvinyl butyl ether, BYK Chemie, Wallingford, Connecticut
[2] Polyacrylate solution, BYK Chemie, Wallingford Connecticut

EXAMPLE 3

A blue pigmented ink composition was made according to the following formula:

| | w/w % |
|---|---|
| DER 331 | 81.7 |
| DER 661 | 4.0 |
| Glymo | 2.0 |
| Ultramarine blue | 5.0 |
| BYK-022 | 1.0 |
| FC-171 | 0.3 |
| UVI-6990 | 6.0 |

EXAMPLE 4

A clear coating was made according to the following formula:

| | w/w % |
|---|---|
| DER 331 | 87.7 |
| DER 661 | 4.00 |
| Glymo | 2.00 |
| BYK-022 | 1.00 |
| FC-171 | 0.30 |
| UVI-6990 | 5.00 |

The above clear coating is useful for application to the substrate prior to application of hot stamping foil.

EXAMPLE 5

A white ink composition was made as follows:

| | w/w % |
|---|---|
| DER 661 | 6.2 |
| DER 331 | 72.08 |
| Titanium dioxide | 13.50 |
| Ultramarine blue | 0.02 |
| Glymo | 1.00 |
| BYK-022 | 1.00 |
| FC-171 | 0.10 |
| Escacure ITX | 0.10 |
| Cyracure UVI 6990 | 6.00 |

EXAMPLE 6

A dark blue colored ink was made as follows:

| | w/w % |
|---|---|
| DER 331 | 63.00 |
| DER 661 | 5.60 |
| Titanium dioxide | 2.30 |
| Carbon black | 1.00 |
| Ultramarine blue | 2.00 |
| Glymo | 1.00 |
| Cyracure UVI-6990 | 6.00 |
| FC-171 | 0.10 |
| BYK-022 | 1.00 |

EXAMPLE 7

A light blue colored ink was made as follows:

| | w/w % |
|---|---|
| DER 331 | 63.9 |
| DER 661 | 5.6 |
| Ultramarine blue | 27.0 |
| Carbon black | 0.2 |
| Titanium dioxide | 0.3 |
| FC-171 | 0.1 |
| Glymo | 1.0 |
| BYK-052 | 1.5 |
| BYK-354 | 1.0 |

EXAMPLE 8

A red ink composition was made as follows:

| | w/w % |
|---|---|
| DER 331 | 75.9 |
| DER 661 | 6.5 |
| Titanium dioxide | 2.0 |
| C.I. Pigment Red 254 | 7.0 |
| Glymo | 1.0 |
| Cyracure UVI-6990 | 5.0 |
| FC-171 | 0.1 |
| BYK-052 | 1.5 |
| BYK-354 | 1.0 |

EXAMPLE 9

A gold ink composition was made as follows:

| | w/w % |
|---|---|
| DER 331 | 65.25 |
| DER 661 | 5.2 |
| Irgazin yellow 2GLTE | 1.0 |
| Gold powder (Brass Flack) | 20.0 |
| Glymo | 1.0 |
| FC-171 | 0.3 |
| Cyracure UVI 6990 | 6.0 |
| BYK-022 | 1.0 |
| Escacure ITX | 0.25 |

EXAMPLE 10

The white ink composition of Example 5 and the red ink composition of Example 8 were used to decorate glass beverage bottles using an OMSO printing machine distributed by Graphics International Group. The OMSO machine was operated at a printing and curing speed of 100 bottles per minute. The white ink was screened onto the container and subjected to a preheat temperature of 50° to 70° C. while traveling on the conveyer and prior to exposure to the UV light source. The ink on the container was then cured by exposure to a 600 watt/inch UV light made by Fusion Corporation for approximately 1 second. Next, the red ink was screened onto the container in the desired design and subjected to the 600 watt/inch UV light for approximately 1 second. The container was then subjected to a temperature of 150° to 200° C. for approximately 2 minutes to finally cure the ink.

The containers decorated above were subjected to various tests as identified below to determine the resistance of the applied decoration.

The Ice Water Test

The containers decorated above were subjected to ice water to determine the resistance of the applied decoration to cold temperatures. Four samples were selected. Two of the samples served as the control. The other two decorated sample containers were filled with distilled water and placed in a tub filled with water having a temperature of 2° C. for a period of 72 hours. At the end of the test period the samples were removed, emptied of distilled water and allowed to equilibrate to room temperature. The samples were visually checked to ascertain the following:

1. Shedding
2. Blistering
3. Change in color
4. Loss of gloss

When the containers subjected to the ice water test were compared with the control containers, no evidence of shedding, blistering, change in color, or loss of gloss was evident.

The Content Test

Twelve samples of the decorated container were selected. Six of the samples served as controls. The other six samples were submerged in a beaker filled with soft drink beverage, making sure that the decoration on each container was submerged in the beverage for a period of 24 hours at room temperature. The bottles were removed from the beaker and the decorated area was rubbed with a soft white cotton fabric and average pressure for a total of 12 passes. Each cotton fabric was examined for spots or color bleeding from the decoration, and each container subjected to the test was compared with the control. The test containers did not exhibit any ascertainable difference between the control containers. None of the cotton fabrics exhibited any spots or color bleeding.

EXAMPLE 11

The whim ink composition of Example 5, the red ink composition of Example 8, and the blue ink composition of Example 7 were used to decorate glass beverage bottles using an OMSO printing machine as defined in Example 10, operated at a curing and printing speed of 100 bottles/minute. First, the white ink was screened onto the containers and subjected to a preheat temperature of 50° to 70° C. while traveling on the conveyer and prior to exposure to UV light. The container was then subjected to a 600 watt/inch UV light source for approximately 1 second. Then, the red ink was screened onto the container in the desired design and subjected to the UV light source for approximately 1 second. The third blue ink composition was then screened onto the container in the desired design and subjected to the UV light source for approximately 1 second. Then the container was subjected to heat of approximately 150° to 200° C. for approximately 2 minutes to finally cure the ink.

Containers decorated in accordance with the above method were subjected to the Ice Water Test and the Content Test as described in Example 10. Four decorated containers were selected for the Ice Water Test. Two of the containers served as controls. The other two containers were subjected to the Ice Water Test. No ascertainable differences between the test and control containers were evident. With respect to the Content Test, six sample containers were selected as controls, and six sample containers were selected as test containers. The test containers were submerged in a beaker filled with soft drink beverage for 72 hours as described in Example 10. The test and control containers were then compared. No evidence of shedding, blistering, color change, or loss of gloss was seen on the test containers when compared with the control containers.

EXAMPLE 12

Glass alcoholic beverage bottles were decorated with the OMSO printing machine identified in Example 10, operating at a printing and curing speed of 100 bottles/minute. The white ink composition of Example 5 was screened onto the glass containers and subjected to a preheat temperature of 50° to 70° C. prior to subjecting to UV light. The container was then subjected to a 600 watt/inch UV light source for approximately 1 second. Next, the blue ink composition was screened onto the container in the desired design and subjected to the UV light source for approximately 1 second. Then the containers were subjected to a temperature of 150° to 200° C. for about 2 minutes to effect final cure.

Four containers decorated in accordance with the above method were selected for the Ice Water Test as described in Example 10. Two of the containers served as controls. The other two containers were subjected to the Ice Water Test. No ascertainable differences between the test and control containers were evident.

Twelve of the containers decorated above were selected for the Content Test as described in Example 10. Six of the containers served as controls. The other six containers were submerged in a beaker with beer for 24 hours at room temperature. None of the test containers exhibited any ascertainable differences between the control containers.

The containers decorated above were tested to determine the resistance of the applied decoration to ethyl alcohol. Four decorated containers were selected. Two of the containers served as the control. A piece of cotton was dampened with ethyl alcohol and squeezed to eliminate excess alcohol. For each container a separate dampened cotton was rubbed over the decoration for a total of 100 passes. The cotton was evaluated and no spots or color or evidence of decoration was visible. The rubbed containers were evaluated by comparing with the control, and no ascertainable difference was evident.

EXAMPLE 13

Glass alcoholic beverage bottles were decorated using the white ink of Example 5 and the dark blue ink of Example 6 using an OMSO decorating machine as described in Example 10 operating at a speed of 100 bottles/minute. The white ink was first screened onto the glass container and subjected to temperature of 50° to 70° C. while on the conveyer prior to UV curing. The container was then subjected to a 600 watt/inch UV light source for approximately 1 second. Next, the dark blue ink of Example 6 was screened onto the container in the desired design and subjected to the UV light source for approximately 1 second. The container was then subjected to a temperature of 150° to 200° C. for about 2 minutes to effect final curing.

EXAMPLE 14

The ink composition of Example 9 was used to decorate glass nail enamel bottles. The ink was silk screened onto the glass containers using a Karoman printing machine operating at a speed of 150 bottles/minute. The bottles were subjected to a UV light source of approximately 600 watts/inch for about 1 second. The decorated containers were then subjected to a temperature of 150° to 170° C. for about 2 minutes to effect final cure of the ink composition.

The nail enamel bottles decorated above were subjected to the Content Test. In particular, twelve nail enamel bottles were selected. Six of the bottles served as controls. The other six bottles were submerged in a beaker filled with nail enamel for a period of 24 hours. The test containers were then evaluated by comparing them with the controls. None of the test containers exhibited any ascertainable difference from the control containers.

EXAMPLE 15

The ink composition of Example 4 was screened onto glass containers and subjected to a 300 Watt UV light source for approximately 1 second. Immediately thereafter, hot stamping foil was compressed against the cured ink design using a compress heated to 250° F. The foil adhered to the ink design but not to the ink-free areas of the glass.

We claim:

1. A method for applying a decoration to a glass substrate comprising:
   a) applying an ink composition curable by exposure to radiation having a wavelength of 4 to 600 nanometers, said ink having a viscosity of 7,000 to 25,000 centipoise at 25° C., containing minimal or no VOCs, and comprising a bisphenol-A epoxy resin, to the glass substrate in a predetermined design that leaves some areas of the glass substrate ink free, using an application method selected from the group consisting of screen printing, gravure printing, offset printing, painting, and combinations thereof, said ink being operable when cured to bond to the glass substrate, and
   b) subsequently curing the ink on the substrate by exposing it to radiation having a wavelength of 4 to 600 nanometers, thereby bonding the ink to the glass substrate.

2. The method of claim 1 wherein the composition comprises, by weight of the total composition, 30–95% of a bisphenol-A epoxy resin and 3–40% pigment.

3. The method of claim 1 wherein the ink composition is pourable at room temperature without application of heat.

4. The method of claim 1 wherein the ink composition is cured by exposure to ultraviolet radiation.

5. The method of claim 1 wherein the ink composition comprises a bisphenol-A epoxy resin of the formula (Formula I):

$$CH_2\text{-}CH\text{-}CH_2\text{-}[\text{-}O\text{-}\phi\text{-}C(CH_3)_2\text{-}\phi\text{-}O\text{-}CH_2CHCH_2(OH)\text{-}]_n\text{-}$$

-continued $$\text{-}O\text{-}\phi\text{-}C(CH_3)_2\text{-}\phi\text{-}O\text{-}CH_2CH\text{-}CH_2\text{(epoxide)}$$

wherein n=0–20.

6. The method of claim 5 wherein the bisphenol-A epoxy resin comprises a mixture of an epoxy resin of Formula I wherein n=0–3 and an epoxy resin of Formula I wherein n is greater than 3.

7. The method of claim 6 wherein the ratio of bisphenol-A epoxy resins of Formula I, wherein n=0–3 to those wherein n is greater than 3 is 10:11 to 40:1 respectively.

8. The method of claim 1, wherein the ink composition comprises 0.1–10% of an adhesion promoter which is an organofunctional silane.

9. The method of claim 8 wherein the organofunctional silane is of the following formula:

$$Y\text{-}(CH_2)_n\text{-}SiX_{3-a}(CH_3)_a$$

wherein n=0–3
a=0–2
Y=$NH_2$, $CH_2=CH$, $$CH_2=C(CH_3)\text{-}COO\text{-},$$

$CH_3\text{-}NH\text{-}$, $NH_2\text{-}CO\text{-}NH\text{-}$, HS, Cl, $NH_2(CH_2)_2NH\text{-}$, imidazoline ring, or $CH_2\text{-}CH\text{-}CH_2O$ (epoxide);

X is each independently $CH_3$, Cl, $OCOCH_3$, $OC_2H_4OCH_3$, $(OC_2H_4)_2OCH_3$, or —OR, where R is a $C_{1-20}$ straight or branched chain alkyl.

10. The method of claim 1, wherein the ink comprises 0.1–20% of a cationic photoinitiator which is an onium salt.

11. The method of claim 1 wherein the ink composition comprises 0.01–5% of a fluorinated surfactant.

12. The method of claim 1 wherein the glass substrate is a beverage or cosmetic container.

13. The method of claim 9 wherein:
a=0,
X=$OCH_3$, $OC_2H_5$, or $CH_3$,
n=3 and
Y=

$$CH_2\text{-}CH\text{-}CH_2O\text{-},$$

$CH_2=C(CH_3)\text{-}COO\text{-}$, $H_2N(CH_2)_2NH\text{-}$, or imidazoline ring.

14. The method of claim 13 wherein:
a=0
X=OCH$_3$
n=3 and
Y=

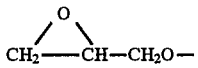

and the compound has the formula:

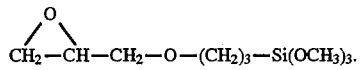

15. The method of claim 10 wherein the cationic photoinitiator is a triarylsulfonium salt.

16. The method of claim 11 wherein the fluorinated surfactant is a fluorinated alkyl ester, fluorinated alkyl polyoxyethylene ethanol, or a fluorinated alkyl alkoxylate.

17. The method of claim 16 wherein the fluorinated surfactant is a fluorinated alkyl alkoxylate.

18. The method of claim 1 wherein the ink composition comprises:

30–95% of a bisphenol-A epoxy resin of the formula (Formula I):

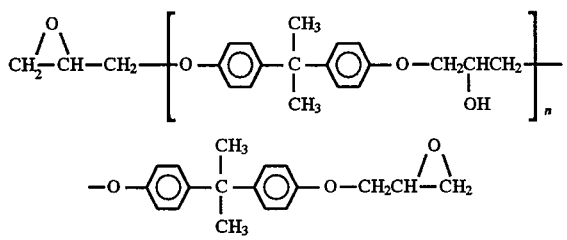

wherein n=0–20.

0.1–10% of an organofunctional silane of the formula (Formula II):

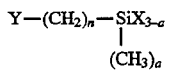

wherein n=0–3
a=0–2

Y=NH$_2$, CH$_2$=CH,

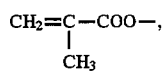

CH$_3$—NH—, NH$_2$—CO—NH—, HS, Cl, NH$_2$(CH$_2$)$_2$NH—,

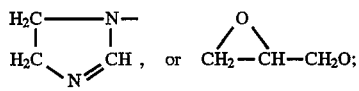

X is each independently CH$_3$, Cl, OCOCH$_3$, OC$_2$H$_4$OCH$_3$, (OC$_2$H$_4$)$_2$OCH$_3$. or —OR, where R is a C$_{1-20}$ straight or branched chain alkyl, preferably methyl or ethyl, 0.1–20% of a photoinitiator which is an onium salt, and 0.01–5% of a fluorinated surfactant which is a fluorinated alkyl ester, a fluorinated alkyl polyoxyethylene ethanol, a fluorinated silicone, or mixtures thereof.

19. The method of claim 18 wherein the composition comprises:

50–85% of the bisphenol-A resin of Formula I that is a liquid at room temperature, 0.1–20% of the bisphenol-A resin of Formula I that is a solid at room temperature, 0.1–10% of an organofunctional silane of Formula II wherein:
a=0
X=OCH$_3$, OC$_2$H$_5$, CH$_3$
n=3
Y=

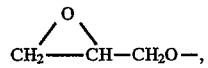

CH$_2$=C(CH$_3$)—COO—, H$_2$N(CH$_2$)$_2$NH—, or

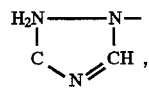

0.1–20% of a photoinitiator which is an onium salt,
0.1–5% of a fluorinated surfactant which is a fluorinated alky alkoxylate, and 0.1–40% pigment.

* * * * *

UNITED STATES PATENT AND TRADEMARK OFFICE
CERTIFICATE OF CORRECTION

PATENT NO : 5,656,336
DATED : August 12, 1997
INVENTOR(S) : Kamen, et al.

Page 1 of 3

It is certified that error appears in the above-identified patent and that said Letters Patent is hereby corrected as shown below:

In column 3, lines 52-56, delete:

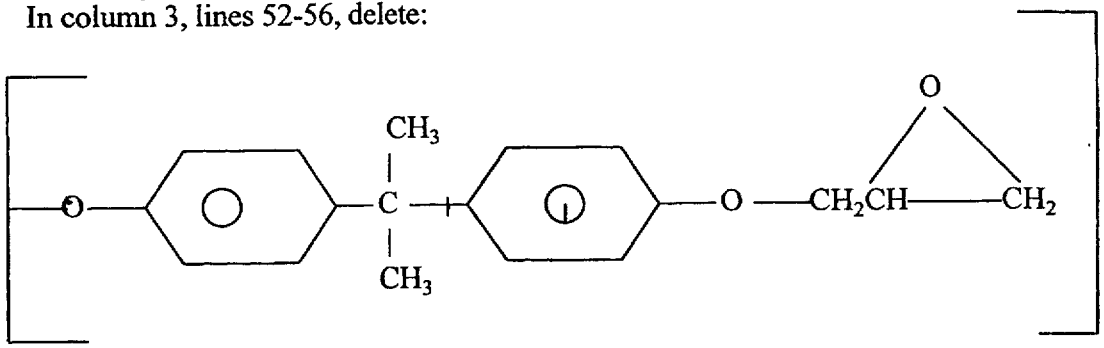

and insert therefor:

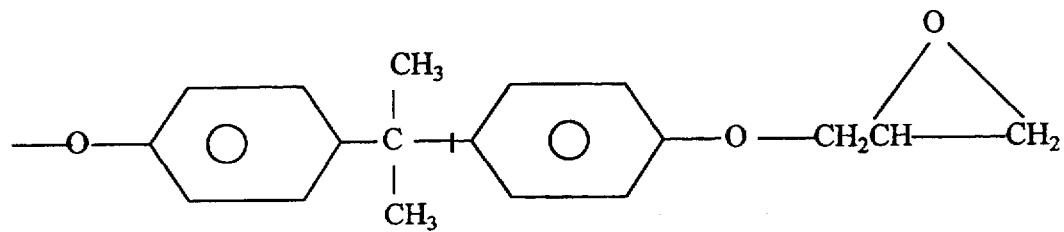

UNITED STATES PATENT AND TRADEMARK OFFICE
CERTIFICATE OF CORRECTION

PATENT NO : 5,656,336
DATED : August 12, 1997
INVENTOR(S) : Kamen, et al.

It is certified that error appears in the above-identified patent and that said Letters Patent are hereby corrected as shown below:

In column 2, lines 1-5, delete:

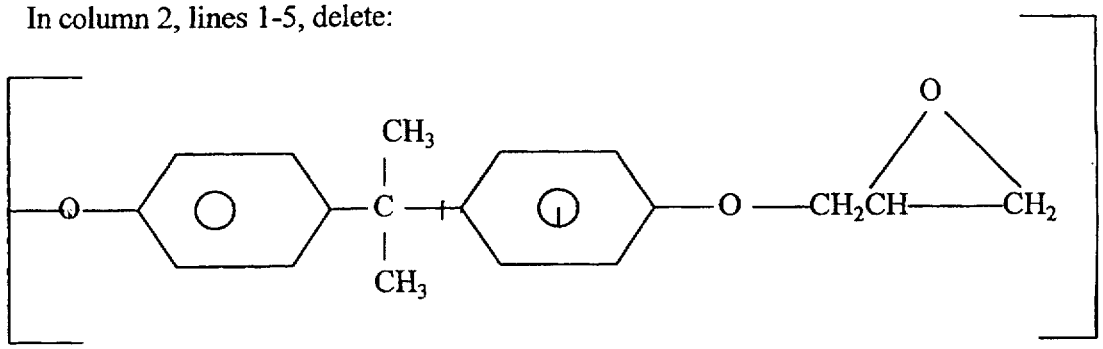

and insert therefor:

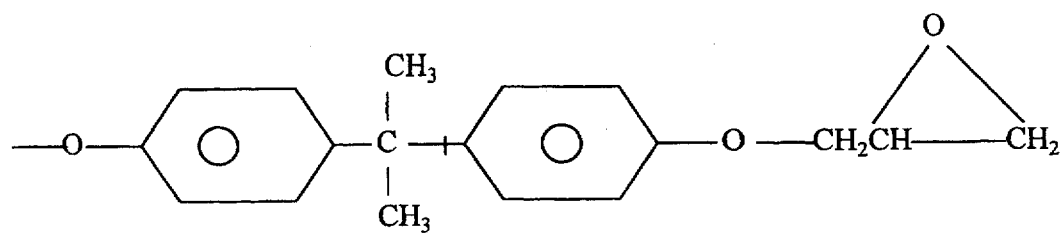

UNITED STATES PATENT AND TRADEMARK OFFICE
CERTIFICATE OF CORRECTION

PATENT NO : 5,656,336
DATED : August 12, 1997
INVENTOR(S) : Kamen, et al.

It is certified that error appears in the above-identified patent and that said Letters Patent are hereby corrected as shown below:

In column 5, line 9, after "The ink compositions" delete "oft he" and insert therefor --of the--.

In column 15, line 10, after "glass containers using a" delete "Karoman" and insert therefor --Kammann--.

In column 16, line 14, after "n is greater than 3 is" delete "10:11" and insert therefor --10:1--.

Signed and Sealed this

First Day of December, 1998

Attest:

BRUCE LEHMAN

Attesting Officer

Commissioner of Patents and Trademarks